United States Patent [19]

Betty

[11] 3,968,318

[45] July 6, 1976

[54] DIMENSIONAL STABILIZATION OF LIGNOCELLULOSIC MATERIALS

[75] Inventor: Robert Warren Betty, Sarnia, Canada

[73] Assignee: Du Pont of Canada Limited, Montreal, Canada

[22] Filed: Feb. 25, 1974

[21] Appl. No.: 445,825

[30] Foreign Application Priority Data
Feb. 28, 1973 Canada................................ 164869

[52] U.S. Cl.................................. 428/511; 427/393
[51] Int. Cl.².................... B32B 23/08; B05D 3/02
[58] Field of Search.............. 117/57, 148; 427/393; 428/511

[56] References Cited
UNITED STATES PATENTS 3,083,118    3/1963    Bridgeford........................... 117/57

*Primary Examiner*—Harry J. Gwinnell

[57] ABSTRACT

Lignocellulosic material (wood) of improved dimensional stability is disclosed. The wood is stabilized with one or more ethylenically unsaturated monomers, at least one of which is a vinyl-N-heterocyclic, especially vinyl pyrrolidone, which have been polymerized. A dimensional stabilization process is also disclosed.

5 Claims, No Drawings

DIMENSIONAL STABILIZATION OF LIGNOCELLULOSIC MATERIALS

BACKGROUND OF THE INVENTION

1. Field of the Invention

This invention relates to dimensionally stabilized lignocellulosic material and a dimensional stabilization process.

2. Description of the Prior Art

It is well known that lignocellulosic materials made up predominantly or entirely of cellulosic fibers, hereinafter described in terms of wood, are sensitive to the effects of water, and expand and contract with variations in humidity in the atmosphere. Such changes in the dimensions of wood are particularly undesirable when the wood is used as a structural material. In a very humid atmosphere the wood may swell until a saturation moisture content of about 30% is obtained, this moisture content being known as the "fiber-saturation point". Below the fiber-saturation point, the water is believed to enter the fine capillary structure of the cell walls of the wood and affect the dimensions of the wood. Above the fiber-saturation point, additional water is believed to enter the cell cavities or coarse capillary structure and usually does not affect the dimensions of the wood under normal conditions.

Techniques for the stabilization of wood are known. Such techniques include the use of coatings, deposition of bulking agents in the cell walls of the wood, decreased hygroscopicity plus bulking and the use of chemical cross-linking agents.

U.S. Pat. No. 3,077,417 describes the use of acrylic monomers in the dimensional stabilization of wood, while U.S. Pat. No. 3,077,419 describes an alternate technique using vinyl substituted aryl monomers. U.S. Pat. No. 3,077,418 describes the use of a styrene mixture to dimensionally stabilize wood. Wood treated with methyl methacrylate and/or styrene is also known and may be used as a flooring, in particular in the form of parquet flooring.

In a typical process for the dimensional stabilization of wood with ethylenically unsaturated monomers, the wood is impregnated with the ethylenically unsaturated monomers and subsequently the monomers are polymerized, thereby giving wood of improved dimensional stability.

Dimensionally stabilized wood is capable of being used as window and/or door frames in buildings as well as in the form of flooring. However, the known techniques for the dimensional stabilization of wood generally are capable of improvement, especially with respect to the degree of dimensional stabilization obtained.

SUMMARY OF THE INVENTION

It has now been found that vinyl-N-heterocyclic monomers, especially vinyl pyrrolidone, when used in a process for the dimensional stabilization of wood, help to provide wood having improved dimensional stability.

Accordingly, the present invention provides lignocellulosic material, of improved dimensional stability, said lignocellulosic material being dimensionally stabilized with one or more ethylenically unsaturated monomers, at least one of which is a vinyl-N-heterocyclic monomer, said monomers being polymerized.

The present invention also provides an improved process for dimensional stabilization of lignocellulosic materials comprising the steps of:

a. impregnating the lignocellulosic material with one or more ethylenically unsaturated monomers, at least one of which is a vinyl-N-heterocyclic monomer, and b. polymerizing the ethylenically unsaturated monomers.

In preferred embodiments the vinyl-N-heterocyclic monomer is vinyl pyrrolidone and the lignocellulosic material is wood.

DETAILED DESCRIPTION OF THE INVENTION

Techniques for impregnating wood or wood products with ethylenically unsaturated monomer(s) are known. For example, the ethylenically unsaturated monomer may be dissolved or dispersed in a wood swelling agent to assist in the penetration of the monomer into the cell wall of the wood. Such impregnation may be carried out at ambient temperatures or slightly elevated temperatures and at atmospheric pressure or sub- or superatmospheric pressure. It is preferred that super-atmospheric pressure be used. The wood swelling agent may be aqueous or organic in nature. Alternatively, the monomer(s) may be contacted with the wood in the absence of a swelling agent.

In the process of the present invention, a vinyl-N-heterocyclic monomer is contacted with the wood. The preferred vinyl-N-heterocyclic monomer is vinyl pyrrolidone. The wood may be contacted with one or more ethylenically unsaturated monomers, at least one of which is a vinyl-N-heterocyclic monomer. Preferred ethylenically unsaturated monomers that may be mixed with the vinyl-N-heterocyclic monomers are styrene and methyl methacrylate.

The manner in which the wood is conditioned prior to being contacted with the ethylenically unsaturated monomer may affect the results obtained with some monomers. It may be preferred if the wood has been conditioned at a humidity of 10–40% at temperatures of 15°–35°C.

Techniques for the polymerization of the ethylenically unsaturated monomer(s) are also known. For example, radiation may be used, particularly high energy particulate radiation or high energy electromagnetic radiation. Examples of such radiation are atomic particles, neutrons, photons, gamma rays, X-rays and electrons. Alternatively, the wood may be simultaneously or separately contacted with the ethylenically unsaturated monomer and a polymerization catalyst, especially a polymerization catalyst that may be initiated by heat. Examples of such catalysts are t-butyl peroxide and azobisisobutyronitrile, the latter being available from E. I. du Pont de Nemours and Company under the trademark Vazo 64.

Wood and wood products exhibit a change in dimensions with changes in the humidity of the surrounding atmosphere. Such changes may be expressed in terms of the percentage change in dimensions, D, between a sample dried in an oven for several hours, for example 100°C. for 24 hours, and the same sample after being immersed in water for several days until no more swelling is noted (equilibrium). As the changes in wood are anisotropic in nature, all measurements should be made in the same direction. The term "reduction in swelling" may be used to describe the improvement in dimensional stability as a result of a treatment process, and may be obtained from $$\text{Reduction in Swelling} = \frac{D_{control} - D_{treated}}{D_{control}} \times 100\%$$

where $D_{control}$ = percentage change in dimension of control sample $D_{treated}$ = percentage change in dimension of treated sample Wood for parquet flooring is usually "quarter cut". Wood is considered to be quarter cut when the radial direction of the tree is aligned across the width of the fingers from which parquet flooring is made, with the tangential direction of the tree being in the thickness direction of the finger. Parquet flooring is cut in this manner so as to minimize the potential dimensional changes in the finger, changes in the radial direction being less than changes in the tangential direction of the tree. The tangential direction of the tree is placed in the thickness direction of the parquet finger where dimensional stability is less critical.

EXAMPLE OF THE INVENTION

The present invention may be illustrated by the following example.

EXAMPLE

From each of seven oven-dried, "quarter cut" parquet fingers made from red oak and measuring 4.75 × 0.95 × 0.30 in. were cut two samples 2 inches in length. All samples were then placed in an autoclave. The autoclave was evacuated to a pressure of about 5 mm. Hg for about 30 minutes before the monomer(s) and polymerization catalyst(s) were injected into the autoclave. After a further 30 minutes, the autoclave was pressurized with nitrogen to a pressure of about 10 atmospheres. After a period of about 24 hours, excess monomer was removed and polymerization was initiated by placing the autoclave in hot (70°C.) water, the pressure in the autoclave still being 10 atmospheres. When the exothermic reaction was complete the autoclave was removed from the hot water and the wood samples were subsequently tested for dimensional stability. The reduction in swelling was reported as an average of all results.

In determining the dimensional stability, all measurements were made in the radial direction of the wood.

The results are given in Table I.

The error in the reduction in swelling is estimated to be about ±10% at a reduction in swelling of 50.

TABLE I

| Run No. | Conditioning of Wood (%RH) | Monomer | Composition of Impregnating Solution (% by Volume) | Catalyst | Reduction in Swelling |
|---|---|---|---|---|---|
| 1 | ambient** | vinyl pyrrolidone | 100* | 0.25% t-butyl peroxide | 55 |
| 2 | 20 | methyl methacrylate | 100 | 0.3% Vazo 64 | 33 |
| 3 | 65 | methyl methacrylate | 100 | 0.3% Vazo 64 | 10 |
| 4 | 0 | methyl methacrylate | 100 | 0.3% Vazo 64 | 8 |
| 5 | 65 | styrene | 100 | 1.0% Vazo 64 | 40 |
| 6 | 65 | styrene<br>vinyl pyrrolidone | 90<br>10 | 0.3% Vazo 64 | 53 |
| 7 | 65 | styrene<br>vinyl pyrrolidone | 80<br>20 | 1.0% Vazo 64 | 48 |
| 8 | 65 | methyl methacrylate<br>vinyl pyrrolidone | 75<br>25 | 0.3% Vazo 64 | 60 |
| 9 | ambient** | methyl methacrylate<br>vinyl pyrrolidone | *** | *** | 53 |

*as 30% aqueous solution
**approximately 40% relative humidity i.e. 40% RH
***samples were sequentially impregnated with a 30% aqueous vinyl pyrrolidone solution containing 0.25% (v/v) t-butyl peroxide; air dried; impregnated with 100% methyl methacrylate containing 0.3% Vazo 64; polymerized.

I claim:

1. Lignocellulosic material, of improved dimensional stability, said lignocellulosic material being dimensionally stabilized by impregnation with one or more polymerized ethylenically unsaturated monomers, at least one of which is vinyl pyrrolidone in an amount of at least 10 percent by volume.

2. The product of claim 1 in which the lignocellulosic material is wood.

3. The wood of claim 2 wherein the sole ethylenically unsaturated compound is vinyl pyrrolidone.

4. The wood of claim 2 stabilized with vinyl pyrrolidone in an amount of at least 10 percent by volume and at least one other ethylenically unsaturated compound.

5. The wood of claim 4 wherein the ethylenically unsaturated compound is selected from the group consisting of styrene and methyl methacrylate, and mixtures thereof.

* * * * *